United States Patent
Batarseh et al.

(10) Patent No.: US 11,248,426 B2
(45) Date of Patent: Feb. 15, 2022

(54) LASER TOOL WITH PURGING HEAD

(71) Applicant: Saudi Arabian Oil Company, Dhahran (SA)

(72) Inventors: Sameeh Issa Batarseh, Dhahran (SA); John Duclos Reece, II, Oxford, AL (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/817,873

(22) Filed: Mar. 13, 2020

(65) Prior Publication Data
US 2021/0285294 A1    Sep. 16, 2021

(51) Int. Cl.
*E21B 7/15* (2006.01)
*E21B 21/00* (2006.01)
*E21B 21/08* (2006.01)

(52) U.S. Cl.
CPC .......... *E21B 21/002* (2013.01); *E21B 21/085* (2020.05)

(58) Field of Classification Search
CPC ............... E21B 7/15; E21B 7/14; E21B 10/60
See application file for complete search history.

(56) References Cited

U.S. PATENT DOCUMENTS

| | | | |
|---|---|---|---|
| 4,227,582 A * | 10/1980 | Price | E21B 7/15 166/297 |
| H389 H | 12/1987 | Moon | |
| 4,997,250 A * | 3/1991 | Ortiz, Jr. | B23K 26/06 219/121.75 |
| 5,938,954 A * | 8/1999 | Onuma | B23K 26/1224 219/121.6 |
| 6,755,262 B2 | 6/2004 | Parker | |
| 8,627,901 B1 | 1/2014 | Underwood et al. | |
| 8,664,563 B2 * | 3/2014 | Abbasi | B23K 26/702 219/121.71 |
| 8,807,218 B2 | 8/2014 | Kleefisch et al. | |

(Continued)

FOREIGN PATENT DOCUMENTS

JP    H07-124781 A    5/1995

OTHER PUBLICATIONS

International Search Report for PCT/IB2020/056485, 5 pages (dated Dec. 14, 2020).

(Continued)

*Primary Examiner* — Kipp C Wallace
(74) *Attorney, Agent, or Firm* — Choate, Hall & Stewart LLP; Charles E. Lyon; Peter A. Flynn

(57) ABSTRACT

An example laser tool is configured to operate within a wellbore of a hydrocarbon-bearing rock formation. The laser tool includes one or more optical transmission media as part of an optical path originating at a laser generator configured to generate a laser beam having an axis. The laser tool includes an optical element for receiving the laser beam from the one or more optical transmission media and for output to the hydrocarbon-bearing rock formation. The laser tool includes a purging head for removing dust or vapor from a path of the laser beam. The purging head is for discharging two or more purging gas streams. The purging head may include a coaxial flow assembly and a helical flow assembly. A coaxial purging gas stream may flow in a direction parallel to the axis. A helical purging gas stream may flow in a helical pattern around and substantially along the axis.

15 Claims, 4 Drawing Sheets

(56) References Cited

U.S. PATENT DOCUMENTS

| | | |
|---|---|---|
| 9,089,928 B2* | 7/2015 | Zediker .............. B23K 26/0652 |
| 10,603,745 B2* | 3/2020 | Bea .................... B23K 26/0876 |
| 2009/0134136 A1 | 5/2009 | Graichen |
| 2010/0044103 A1* | 2/2010 | Moxley ................... E21B 43/11 |
| | | 175/16 |
| 2010/0078414 A1 | 4/2010 | Perry et al. |
| 2012/0074110 A1* | 3/2012 | Zediker .............. B23K 26/1224 |
| | | 219/121.72 |
| 2014/0360778 A1 | 12/2014 | Batarseh |
| 2019/0257156 A1* | 8/2019 | Batarseh .................. E21B 7/15 |
| 2019/0353032 A1 | 11/2019 | Batarseh |
| 2020/0048966 A1 | 2/2020 | Batarseh |
| 2020/0048967 A1 | 2/2020 | Batarseh |

OTHER PUBLICATIONS

Written Opinion for PCT/IB2020/056485, 5 pages (dated Dec. 14, 2020).

* cited by examiner

LASER TOOL WITH PURGING HEAD

TECHNICAL FIELD

This specification describes examples of laser tools that are usable in a wellbore to create fluid flow paths through hydrocarbon-bearing rock formations.

BACKGROUND

Wellbore stimulation is a branch of petroleum engineering focused on ways to enhance the flow of hydrocarbons from a rock formation into a wellbore. The flow of hydrocarbons from a rock formation into a wellbore is based, at least in part, on a permeability of the rock formation. When the permeability of the rock formation is small, stimulation may be applied to enhance the flow of hydrocarbons from the rock formation. In some cases, stimulation may be performed in stages. For example, a first stage of the stimulation may include perforating walls of the wellbore to create tunnels through the walls and through the rock formation. A second stage of the stimulation may include pumping fluids into the tunnels. The fluids fracture rock in the rock formation, thereby creating a fluid flow path into the wellbore. Hydrocarbons, such as oil, may flow along the fluid flow path and into the wellbore.

SUMMARY

An example laser tool is configured to operate within a wellbore of a hydrocarbon-bearing rock formation. The laser tool includes one or more optical transmission media. The one or more optical transmission media are part of an optical path originating at a laser generator configured to generate a laser beam having an axis. The one or more optical transmission media are for passing the laser beam. The laser tool includes an optical element that is part of the optical path. The optical element is for receiving the laser beam from the one or more optical transmission media and for output to the hydrocarbon-bearing rock formation. The laser tool includes a purging head for removing dust or vapor from a path of the laser beam. The purging head is for discharging two or more purging gas streams.

The two or more purging gas streams may include a coaxial purging gas stream flowing in a direction parallel to the axis. The two or more purging gas streams may include a purging gas stream flowing in a helical pattern around and substantially along the axis. The two or more purging gas streams may include a coaxial purging gas stream flowing in a direction parallel to the axis and a helical purging gas stream flowing in a helical pattern around and substantially along the axis.

The purging head may include a coaxial flow assembly. The coaxial flow assembly may include a coaxial gas inlet fitting in fluid communication with a gas conduit and a gas source for flowing a purging gas stream. The coaxial flow assembly may include a coaxial flow device body including a mixing chamber in fluid communication with the coaxial gas inlet fitting for receiving the purging gas stream from the coaxial gas inlet fitting. The coaxial flow assembly may include a coaxial flow tube in fluid communication with the mixing chamber. The coaxial flow tube may be for receiving the purging gas stream and for discharging the purging gas stream in a direction parallel to the axis.

The coaxial flow assembly may include a first coaxial gas inlet fitting and a second coaxial gas inlet fitting, each in fluid communication with a gas conduit and a gas source for flowing a purging gas stream. The coaxial flow assembly may include a coaxial flow device body including a mixing chamber in fluid communication with the first and second coaxial gas inlet fittings. The first and second coaxial gas inlet fittings are for receiving a first purging gas stream from the first coaxial gas inlet fitting and a second purging gas stream from second coaxial gas inlet fitting. The mixing chamber is for mixing the first purging gas stream and the second purging gas stream to generate a mixed purging gas stream. The coaxial flow assembly may include a coaxial flow tube in fluid communication with the mixing chamber. The coaxial flow tube may be for receiving the mixed purging gas stream and for discharging the mixed purging gas stream in a direction parallel to the axis.

The first purging gas stream and the second purging gas stream may include the same type of gas.

The purging head may include a helical flow assembly. The helical flow assembly may include a helical gas inlet fitting in fluid communication with a gas conduit and a gas source for flowing a purging gas stream. The helical flow assembly may include a helical flow device body in fluid communication with the helical gas inlet fitting. The helical flow device body is for receiving the purging gas stream from the helical gas inlet fitting. The helical flow assembly may include a helical flow tip in fluid communication with the helical flow body. The helical flow tip is for receiving the purging gas stream from helical flow device body and for discharging the purging gas stream in a helical pattern around and substantially along the axis.

The helical flow tip may be rotatable about the axis. Rotation of the helical flow tip may be caused by the purging gas stream flowing through the helical flow tip.

The helical flow tip may be mounted on a flow tip carrier. The flow tip carrier may be rotatably connected to the helical flow body.

The purging head may include a coaxial flow assembly including a coaxial gas inlet fitting in fluid communication with a gas conduit and a gas source, a coaxial flow device body including a mixing chamber in fluid communication with the coaxial gas inlet fitting, a coaxial flow tube in fluid communication with the mixing chamber, a helical flow assembly including a helical gas inlet fitting in fluid communication with a gas conduit and a gas source, a helical flow device body in fluid communication with the helical gas inlet fitting, and a helical flow tip in fluid communication with the helical flow body.

The purging head may include a coaxial flow assembly including a first coaxial gas inlet fitting and a second coaxial gas inlet fitting, each in fluid communication with a gas conduit and a gas source for flowing a purging gas stream, a coaxial flow device body including a mixing chamber in fluid communication with the first and second coaxial gas inlet fittings, a coaxial flow tube in fluid communication with the mixing chamber, a helical flow assembly including a helical gas inlet fitting in fluid communication with a gas conduit and a gas source for flowing a purging gas stream, a helical flow device body in fluid communication with the helical gas inlet fitting, and a helical flow tip fluid communication with the helical flow body.

An example method is performed within a wellbore of a hydrocarbon-bearing rock formation. The method includes passing, through one or more optical transmission media, a laser beam having an axis generated by a laser generator at an origin of an optical path comprising the one or more optical transmission media; and purging a path of the laser beam using a purging head. The purging head may discharge two or more purging gas streams.

The method includes sublimating the hydrocarbon-bearing rock formation using the laser beam to create a tunnel to a target penetration depth.

The two or more purging gas streams may include a coaxial purging gas stream flowing in a direction parallel to the axis. The two or more purging gas streams may include a helical purging gas stream flowing in a helical pattern around and substantially along the axis.

The two or more purging gas streams may include a coaxial purging gas stream flowing in a direction parallel to the axis and a helical purging gas stream flowing in a helical pattern around and substantially along the axis. The purging head may include a helical flow assembly, the helical flow assembly comprising a helical flow tip, and the method comprises rotating the helical flow tip about the axis. The method may include mixing at least one or at least two purging gas streams prior to discharge.

Any two or more of the features described in this specification, including in this summary section, may be combined to form implementations not specifically described in this specification.

At least part of the processes and systems described in this specification may be controlled by executing, on one or more processing devices, instructions that are stored on one or more non-transitory machine-readable storage media. Examples of non-transitory machine-readable storage media include, but are not limited to, read-only memory, an optical disk drive, memory disk drive, random access memory, and the like. At least part of the processes and systems described in this specification may be controlled using a computing system comprised of one or more processing devices and memory storing instructions that are executable by the one or more processing devices to perform various control operations.

The details of one or more implementations are set forth in the accompanying drawings and the description. Other features and advantages will be apparent from the description and drawings, and from the claims.

DESCRIPTION OF THE DRAWINGS

Like reference numerals in the figures indicate like elements.

DETAILED DESCRIPTION

Figure 1:
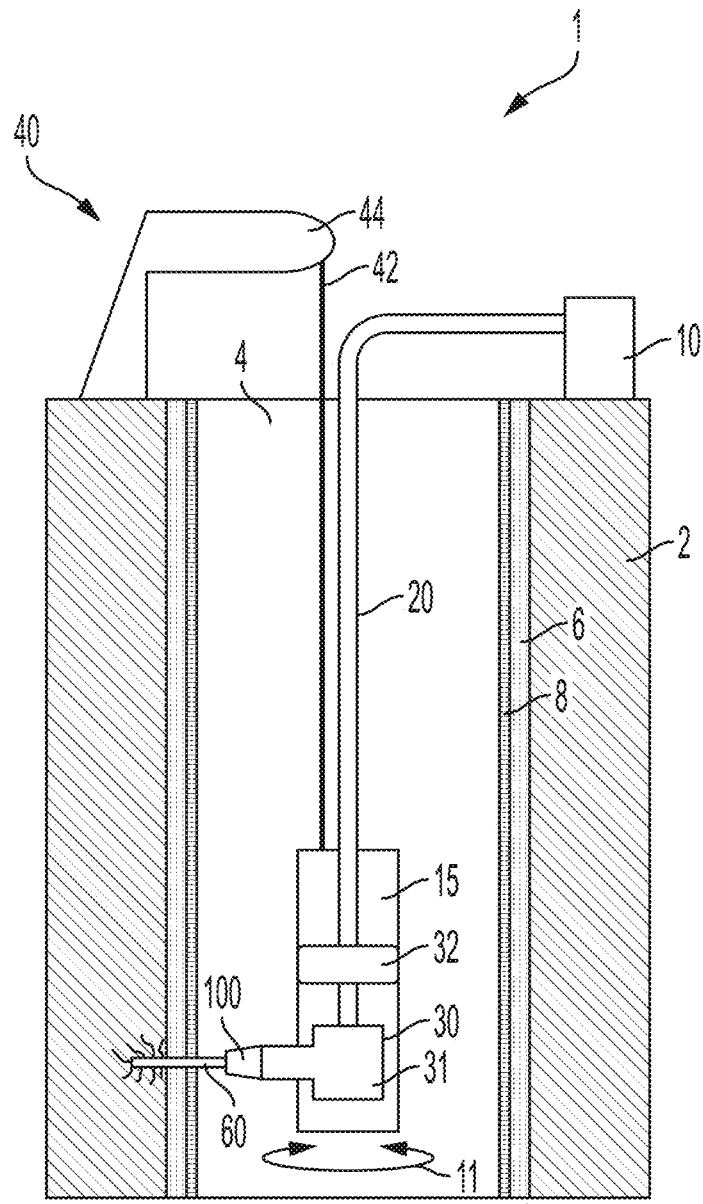
FIG. 1 is a cross-sectional view of an example system for creating fluid flow paths through hydrocarbon-bearing rock formations.

This specification describes examples of laser tools for creating fluid flow paths through hydrocarbon-bearing rock formations. An example laser tool is introduced into a wellbore that extends through a hydrocarbon-bearing rock formation. The laser tool may operate downhole to create a fluid flow path through a wellbore casing and the rock formation. The fluid flow path is created by controlling the laser tool to direct a laser beam to rock in the rock formation. In one example, the laser beam has an energy density that is great enough to cause at least some of the rock in the rock formation to sublimate. Sublimation includes changing from a solid phase directly into a gaseous phase without first changing into a liquid phase. In the case of rock, sublimation occurs when the temperature of the rock, which is increased by the laser beam, exceeds a threshold. That threshold is known as the sublimation point and may be different for different types of rock. In this example, the sublimation of the rock creates tunnels or cracks through the rock formation. Fluids may be introduced into those tunnels or cracks to fracture the rock formation and thereby promote the flow of production fluid, such as oil, from the rock formation into the wellbore. In another example, the laser beam has an energy density that is great enough to cause fluid dispersed in the rock (for example, in layers including clay) to evaporate or to cause reduction in viscosity of such dispersed fluids, causing loss of fluid from the rock formation. Evaporation or other loss of fluid in a region of the rock formation may cause rock in the region to disintegrate or collapse, leading to holes or cavities in the rock.

An implementation of the laser tool described in the preceding paragraph includes a focusing system that holds an optical element. An example of an optical element is a (unitary) optical structure configured—for example, structured, arranged, or both—to manipulate a laser beam. Manipulation includes altering one or more properties of the laser beam. Examples of optical elements include a crystal and a lens.

The optical element is configured to receive, via an optical path, a raw laser beam output from a laser generator. The optical path may include one or more optical transmission media, such as fiber optic cables, that are strung downhole. The received laser beam is "raw" in the sense that the laser beam has not been acted-upon by the optical element. The optical element manipulates the raw laser beam by altering a geometry of the raw laser beam, a direction of the raw laser beam, or both the geometry and the direction of the raw laser beam. The laser beam output by the optical element is directed to the rock formation where, as described previously, the laser beam may heat rock to cause tunnels or cracks to form in the rock formation. The laser tool may be configured to rotate, which also affects the direction of the laser beam.

The example laser tool may also include one or more sensors to monitor environmental conditions in the wellbore and to output signals indicative of the environmental conditions. Examples of the sensors may include temperature sensors to measure temperature downhole, pressure sensors to measure pressure downhole, and acoustic sensors to measure noise levels downhole. Other sensors may also be used as described in this specification. Signals received from the sensors may indicate that there are problems inside the wellbore or that there are problems with the laser tool. A drilling engineer may take corrective action based on these signals. For example, if a temperature or pressure downhole is such that drilling equipment, such as the laser tool, may be damaged, that equipment may be withdrawn from the wellbore.

FIG. 1 shows components of a system 1 that includes an implementation of a laser tool 30 of the type described in the preceding paragraphs. At least part of system 1 is disposed within wellbore 4. Wellbore 4 passes through a hydrocarbon-bearing rock formation 2 ("rock formation 2"). Rock formation 2 may include various materials, such as limestone, shale, or sandstone. Each of these materials has a different sublimation point. The sublimation point may be affected by properties of the material, such as the density of the material and the porosity of the material. A casing 8 is cemented 6 in place to reinforce the wellbore against rock formation 2. A string 15 that houses the laser tool 30 is run downhole through casing 8.

Laser tool 30 is configured to output a laser beam 60. In this example, the laser tool is also configured to rotate about an axis in the wellbore, such as a central axis of the wellbore. In some implementations, the laser tool 30 is mounted on an axle (not shown) for rotation. A motor 32 may be included in string 15 to implement the rotation of laser tool 30 about the axle. In some implementations, the entire string 15 is connected to a drive arrangement 46 that is configured to rotate string 15 and thus laser tool 30. Rotation of the laser tool is identified by circular arrow 11. During rotation, laser beam 60 may sweep the entire circumference of the wellbore. That is, the laser tool may rotate a full 360°. In some cases, the laser tool may rotate less than 360°.

Laser tool 30 is configured to direct laser beam 60 parallel to a surface containing the wellhead or at an angle that is not parallel to the surface. Laser tool 30 includes an optical element that is configured to affect the output of the laser beam. For example, an optical element may direct, collimate, focus, defocus, or otherwise manipulate the direction or geometry of the laser beam 60 prior to output. Laser tool 30 may include laser tool purging head 100 connected to laser tool body 31. Laser tool purging head 100 may be configured to reduce or to eliminate dust and vapor in the path of a laser beam 60. Dust or vapor in the path of laser the laser beam may disrupt, bend, or scatter the laser beam.

System 1 includes a laser generating unit, such as laser generator 10. Laser generator 10 is configured to generate a laser beam and to output the laser beam to the laser tool. In some implementations, laser generator 10 is at the surface near to the wellhead. In some implementations, laser generator 10 is downhole, in whole or in part. The laser beam output by laser generator 10 is referred to as a raw laser beam because it has not been manipulated by laser tool 30. Examples of laser generator 10 include ytterbium lasers, erbium lasers, neodymium lasers, dysprosium lasers, praseodymium lasers, and thulium lasers. In an example implementation, laser generator 10 is a 5.34 kilowatt (kW) ytterbium-doped, multi-clad fiber laser.

In some implementations, laser generator 10 can be configured to output laser beams having different energy densities. Laser beams having different energy densities may be useful for rock formations that are composed of different materials having different sublimation points. For example, laser beams having different energy densities may be used to sublimate different types of rocks in a rock formation or to liquefy or evaporate fluids dispersed in a rock formation. In some implementations, the operation of laser generator 10 is programmable. For example, laser generator 10 may be programmed to vary the optical properties of the laser beam or the energy density of the laser beam.

In some implementations, the laser beam output by laser generator 10 has an energy density that is sufficient to heat at least some rock to its sublimation point. In this regard, the energy density of a laser beam is a function of the average power output of the laser generator during laser beam output. In some implementations, the average power output of laser generator 10 is in one or more of the following ranges: between 500 Watts (W) and 1000 W, between 1000 W and 1500 W, between 1500 W and 2000 W, between 2000 W and 2500 W, between 2500 W and 3000 W, between 3000 W and 3500 W, between 3500 W and 4000 W, between 4000 W and 4500 W, between 4500 W and 5000 W, between 5000 W and 5500 W, between 5500 W and 6000 W, between 6000 W and 6500 W, or between 6500 W and 7000 W.

Laser generator 10 is part of an optical path that includes laser tool 30 and one or more optical transmission media. This optical path extends to the optical element in the laser tool. An example of an optical transmission medium that may be used is fiber optic cable 20. Fiber optic cable 20 may include a single fiber optic strand, multiple fiber optic strands, or multiple fiber optic cables that are run downhole from laser generator 10. Fiber optic cable 20 conducts the raw laser beam output by laser generator 10 to the laser tool 30. As described, the laser tool may manipulate the laser beam to change the geometry of the laser beam, the direction of the laser beam, or both. A laser beam 60 output from the laser tool may penetrate downhole casings and cement to reach the rock formation. In the example of FIG. 1, this means that the laser beam exits string 15 and penetrates casing 8 and cement 6 in order to reach the rock formation 2. The system may be configured to minimize, or to reduce, power loss along the optical path. In some implementations, each laser beam 60 has a power density or energy density (at the laser beam's target) that is 70% or more of the power density or energy density of the laser beam output by laser generator 10.

The duration that the laser beam is applied to the rock in the formation may affect the extent to which the laser beam sublimates, and therefore penetrates, the rock. For example, the more time that the laser beam is applied to a particular location, the greater the penetration of the rock at that location may be.

In some implementations, laser generator 10 is configured to operate in a run mode until a target penetration depth is reached. A run mode may include a cycling mode, a continuous mode, or both. During the continuous mode, laser generator 10 generates a laser beam continuously, for example, without interruption. In the continuous mode, laser generator 10 produces the laser beam until a target penetration depth is reached. During the cycling mode, laser generator 10 is cycled between being on and being off. In some implementations, laser generator 10 generates a laser beam during the on period. In some implementations, laser generator 10 does not generate a laser beam during the off period. In some implementations, laser generator 10 generates a laser beam during the off period, but the laser beam is interrupted before reaching laser tool 30 downhole. For example, the laser beam may be safely diverted or the laser beam may be blocked from output. Laser generator 10 may operate in the cycling mode to reduce the chances of one or more components of the system overheating, to clear a path of the laser beam, or both.

In the cycling mode, a duration of an on period can be the same as a duration of an off period. In the cycling mode, the duration of the on period can be greater than the duration of the off period, or the duration of the on period can be less than the duration of the off period. The duration of each on period and of each off period may be based on a target penetration depth. Other factors that may contribute to the duration of on periods and the duration of off periods include, for example, rock type, purging methods, laser beam diameter, and laser power.

The duration of each on period and of each off period may be determined by experimentation. Experiments on a sample of rock from a formation may be conducted prior to, or after, lowering the laser tool into the wellbore. Such experiments may be conducted to determine, for a cycling mode, optimal or improved durations of each on period and of each off period. Alternatively or additionally, the duration of each on period and of each off period may be determined by geological methods. For example, seismic data or subsurface maps of rock formation 2 may be analyzed and the duration may be based on the result of the analysis or analyses.

In some implementations, on periods and off periods can last between one and five seconds. In an example operation, the on period lasts for 4 seconds and the off period lasts for 4 seconds. Such operation may enable the laser beam to penetrate a rock formation comprised of berea sandstone to a depth of 30 centimeters (cm).

In this regard, the selection of a run mode may be based on a type of rock to penetrate and a target penetration depth. A rock formation that may require the laser generator to operate in the cycling mode includes, for example, sandstones having a large quartz content, such as berea sandstone. A rock formation that may require the laser generator to operate in the continuous mode includes, for example, limestone.

Target penetration depth may be determined based on a variety of factors, such as a type of material or rock in the formation, a maximum horizontal stress of material or rock in the formation, a compressive strength of material or rock in the formation, a desired penetration depth, or a combination of two or more of these features. In some examples, penetration depth is measured from the interior wall of the wellbore. Examples of penetration depths may be on the order of millimeters, centimeters, or meters. Examples of penetration depths may include penetration depths between 1 millimeter (mm) and 10 mm, penetration depths between 1 centimeter (cm) and 100 cm, and penetration depths between 1 meter (m) and 200 m.

System 1 may include a motion system 40. The motion system can include, for example, a hydraulic system, an electrical system, or a motor operated system to move the laser tool to a target location. In this regard, the motion system is configured to move the laser tool to different locations, such as depths, within the wellbore 4. To this end, the motion system includes at least one component that is movable within the wellbore. For example, the motion system may include cable 42 that is configured to move uphole or downhole to enable the laser tool reach a target elevation. In an example, cable 42 may be at least partially spooled on a reel. A motor 44 may be connected to the reel. Motor 44 is configured to drive the reel to wind or to unwind cable 42. This causes cable 42 to move uphole or downhole within the wellbore.

Cable 42 is connected physically to string 15 such that movement of cable 42 translates to corresponding movement of string 15. As noted, string 15 houses laser tool 30. Thus, when string 15 moves, laser tool 30 also moves. Accordingly, the length of cable 42 within the wellbore may be controlled to position the laser tool.

In some implementations, the motion system uses components other than cable 42 to move the laser tool. For example, the motion system may use a coiled tubing string to connect to string 15. The coiled tubing string may be moved uphole or downhole in the same manner as cable 42 is moved uphole or downhole.

In some implementations, the motion system can include a rotational drive system to implement rotation of string 15, and thus rotation of laser tool 30, about an axis in the wellbore. In an example implementation, the rotational drive system includes a motor and a drive train, such as an axle or rack and pinion arrangement (not shown), connected to cable 42 to implement the rotation of string 15.

A computing system may be configured—for example, programmed—to control positioning and operation of the laser tool. Examples of computing systems that may be used are described in this specification. Alternatively, or in addition, the laser generator may be configured to control positioning and operation of the laser tool. For example, the laser generator may include circuitry or may include an on-board computing system to implement control over the positioning and operation of the laser tool. In either case, signals may be exchanged with the motion system and the laser tool via wired or wireless connections. In some implementations, signals may be exchanged with the motion system or laser tool via fiber optic media.

During operation, laser tool 30 may relay its angular position to a control system, such as the computing system or the laser generator. In response, the control system may to operate the tool to form tunnels or cracks in the rock formation.

Materials used to implement the downhole components of system 1 may be resistant to the temperatures, pressures, and vibrations that may be experienced within wellbore 4. The materials may protect the system from fluids, dust, and debris. In some implementations, the materials include one or more of iron, nickel, chrome, manganese, molybdenum, niobium, cobalt, copper, titanium, silicon, carbon, sulfur, phosphorus, boron, tungsten, steel, steel alloys, stainless steel, or tungsten carbide.

A laser tool 30 may include a focusing system (not shown) to focus the laser beam. The focusing system includes an optical element. The optical element is configured to receive a raw laser beam from the optical transmission path and to manipulate the raw laser beam to produce a laser beam output, such as laser beam 60. As described, manipulating the laser beam may include altering a direction of the laser beam or changing a geometry of the laser beam. The geometry of the laser beam may include the cross-sectional shape of the laser beam. For example, the cross-sectional shape of the laser beam may change from circular to oval or from oval to rectangular. The geometry of the laser beam may include the size of the laser beam. For example, during focusing, the laser beam may decrease in cross-sectional diameter and volume, but maintain its overall shape. During defocusing—or scattering—the laser beam may increase in cross-sectional diameter and in volume.

An optical element may include a crystal, a lens, a mirror, a prism, a cube, a cylinder, or a cone. In some examples, an optical element is or includes a cylinder. One or both bases of the cylinder can be flat, angled, conical, concave, or convex. In some examples, an optical element is made of glass, plastic, quartz, crystal, or any other material capable of directing, focusing, or otherwise affecting a geometry or other property of a laser beam. In some examples, an optical element may be a single optical structure comprised of two or more components, such as a crystal, a lens, a mirror, a prism, a cube, a cylinder, or a cone.

The laser focusing system of a laser tool 30 may be optically connected to laser tool purging head 100. The laser beam passes through the focusing system and exits the focusing system through purging head 100.

A laser tool purging head 100 may be configured to clear a path between an optical element and a hydrocarbon-bearing rock formation by discharging a purging medium on or near an exit of laser beam 60 from laser tool 30. Dust or vapor in the path of laser the laser beam may disrupt, bend, or scatter the laser beam. Discharging the purging medium may reduce or eliminate debris, dust, or vapor in the path of a (collimated) laser beam.

An example laser tool purging head 100 that can be used with the laser technologies described in this specification is described here. An example purging head 100 may include one or more devices or assemblies that discharge one or more purging media on or near a location of exit of a laser beam 60 from a laser tool 30. The choice of purging media to use, such as liquid or gas, can be based on the type or rock in the formation and the pressure of a reservoir associated with the formation. In some implementations, the purging media can be, or include, a non-reactive, non-damaging gas such as air, nitrogen, helium, argon, or carbon dioxide. A gas purging medium may be appropriate when fluid pressure in the wellbore is small, for example, less than 50000 kilopascals, less than 25000 kilopascals, less than 10000 kilopascals, less than 5000 kilopascals, less than 2500 kilopascals, less than 1000 kilopascals, or less than 500 kilopascals. A liquid purging medium may be appropriate when fluid pressure in the wellbore is greater than, for example, 50000 kilopascals, In some implementations, purging may be cyclical. In some implementations, purging may be steady or continuous, for example, steady purging may occur while the laser beam is on. In some implementations, purging may be steady or continuous, for example, steady purging may occur while the laser beam is off. A laser tool purging head 100 may be configured to produce one or more flow patterns in one or more purging media. In some implementations, a purging medium may be discharged such that a purging medium flow pattern is linear or straight. A linear or straight flow may be laminar or turbulent, or may include both laminar and turbulent regions. In some implementations, a purging medium may be discharged such that a purging medium flow pattern is helical or spiral flow. A helical or spiral flow may be laminar or turbulent, or may include both laminar and turbulent regions.

In some implementations, an example laser tool purging head 100 maybe configured to discharge two purging gas streams: a linear or coaxial gas stream and a separately induced helical stream, for example, in a pattern where the helical stream envelops the linear stream. A direction of a linear stream and a helical stream may be parallel to or along an axis of a laser beam discharged by a laser tool 30. A combined stream may enhance strength, longevity, and coherence of flow in the direction of the laser beam. Gas input pressure into laser tool purging head 100 may vary depending on desired flow patterns. In an example implementation, gas input pressure into a laser tool purging head 100 may be between 100 and 10,000 kilopascals (kPa), for example, about 1000-1400 kPa. In some implementations, a purging gas stream may cool one or more components of laser tool 30 during operation.

Figure 2:
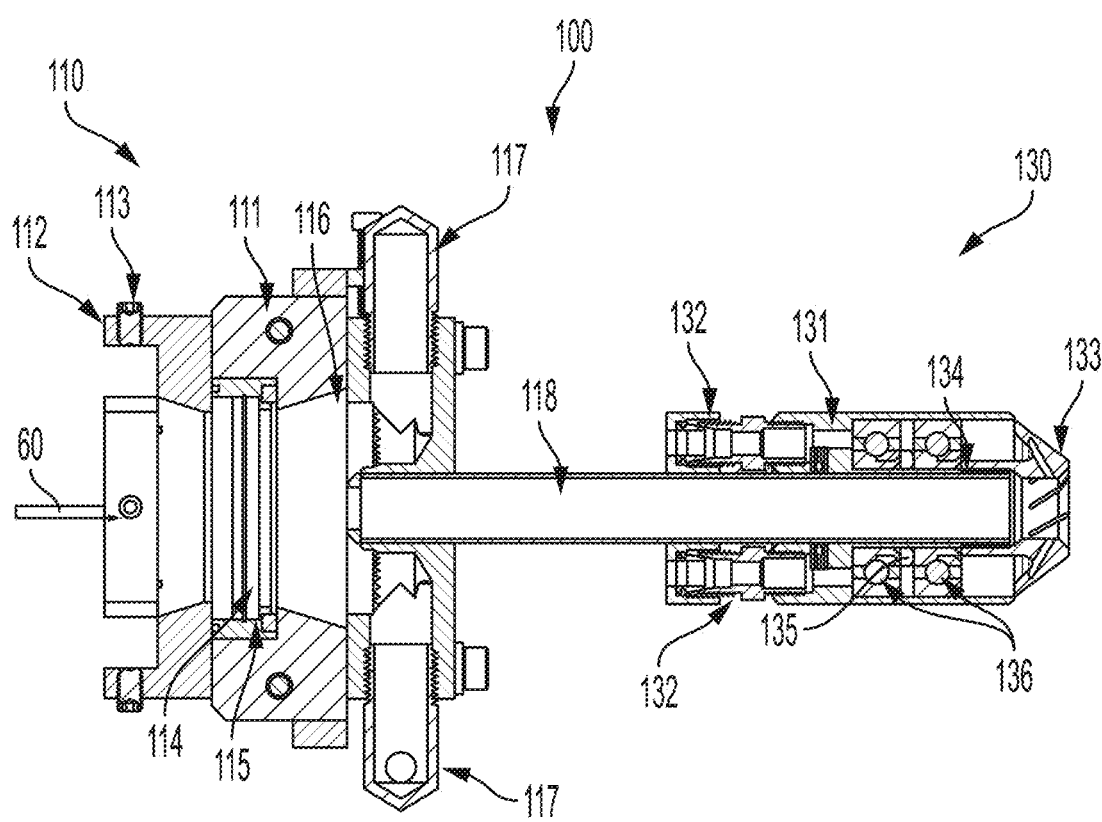
FIG. 2 is a cut-away drawing of an example purging head for use with an example system for creating fluid flow paths through hydrocarbon-bearing rock formations.

An example laser tool purging head 100 is shown in FIG. 2. In some implementations, a purging head 100 includes a coaxial flow assembly 110 to generate a linear or coaxial purging gas stream parallel to or along an axis of a laser beam 60 or a helical flow assembly 130 to generate a spiral or helical purging gas stream substantially around an axis of a laser beam 60, or both.

An example coaxial flow assembly 110 may include a coaxial flow device body 111. A coaxial flow assembly 110 may be integrated into a laser tool 30, for example, mounted on laser tool body 31 via coaxial flow device mount 112. Coaxial flow device mount 112 may form part of coaxial flow device body 111 or may be connected to coaxial flow device body 111. An example coaxial flow device mount 112 may include one or more fasteners, for example, one or more mounting screws 113. Coaxial flow assembly 110 may be mounted on or integrated into a laser tool 30 such that a laser beam, for example, a collimated laser beam 60, enters the coaxial flow device body 111 at a proximal end (upstream end) through a cover window 114. In some implementations, a cover window 114 may be made of any transparent or semi-transparent material, and may be removable or replaceable. In some implementations, a cover window 114 may be mounted on a holder or tray, for example, on a removable fluid-cooled tray 115.

In some implementations, a cover window 114 may form a proximal end of a mixing chamber 116 in coaxial flow device body 111. In some implementations, a mixing chamber 116 may be in fluid communication with one or more coaxial gas inlet fittings 117. One or more coaxial gas inlet fittings 117 may each have a proximal (upstream) end connected to or in fluid communication with a gas line (not shown) and may each have a distal (downstream) end connected to or in fluid communication with mixing chamber 116. In an example embodiment, coaxial flow device body 111 may be connected to two diametrically opposed coaxial gas inlet fittings 117. In some implementations, two or more gas streams may enter mixing chamber 116 at different flow rates or with different flow patterns. In some implementations, two or more gas streams may enter mixing chamber 116 at the same flow rates or with the same flow patterns. In some implementations, a mixing chamber 116 may be configured to equilibrate or stabilize two or more gas streams. A coaxial or linear purging gas stream may exit mixing chamber 116 through a distal (downstream) end, which may be connected to or in fluid communication with a coaxial flow tube 118, for example, at a proximal (upstream) end of coaxial flow tube 118. A coaxial or linear purging gas stream may exit coaxial flow tube 118 at a distal (downstream) end and may be discharged to a wall in a wellbore, for example, to a rock formation 2 surrounding the wellbore 4.

In some implementations, during operation, a laser beam 60 traverses mixing chamber 116 and subsequently traverses coaxial flow tube 118. A laser tool 30 may be configured such that a laser beam 60 maintains a parallel beam configuration with no more than a 70% beam-to-orifice fill ratio at the distal end of coaxial flow tube 118.

In some implementations, a purging head 100 includes a helical flow assembly 130 to generate a spiral or helical purging gas stream substantially around an axis of a laser beam 60. In some implementations, a purging head 100 includes a coaxial flow assembly 110 to generate a coaxial or linear purging gas stream parallel to or along an axis of a laser beam 60 and a helical flow assembly 130 to generate a spiral or helical purging gas stream substantially around an axis of a laser beam 60. A helical flow assembly 130 may be configured such that the helical stream flows in a helical pattern around and substantially along the axis, thereby enveloping a coaxial or linear purging gas stream discharged from a coaxial flow assembly.

An example helical flow assembly 130 may include a helical flow device body 131 that may be mounted on coaxial flow tube 118, for example, on or near a distal (downstream) end of coaxial flow tube 118. A helical flow device body 131 may form a mixing chamber and may be connected to or in fluid communication with one or more helical gas inlet fittings 132. One or more helical gas inlet fittings 132 may each have a proximal (upstream) end connected to or in fluid communication with a gas line (not shown) and may each have a distal (downstream) end connected to or in fluid communication with helical flow device body 131. In an example embodiment, helical flow device body 131 may be connected to two diametrically opposed coaxial gas inlet fittings 117.

An example helical flow assembly 130 may include a helical flow tip 133. A helical flow tip 133 may include one or more holes, slots, or jets, or other implements, that may allow a fluid stream to pass through a helical flow tip 133. In some implementations, a helical flow tip 133 may be connected to or mounted on a flow tip carrier 134 housed at least in part in the helical flow device body 131. A flow tip carrier 134 may rotate around coaxial flow tube 118. An example helical flow assembly 130 may include one or more linear thrust bearings 135. An example helical flow assembly 130 may include one or more radial bearings 136. In some implementations, a linear thrust bearing 135 may be made at least in part of metal or a ceramic material. In some implementations, a radial bearing 136 may be made at least in part of metal or a ceramic material. In an example implementation, an example flow tip carrier 134 may be connected to helical device body 131 via one or more radial bearings 134 such that flow tip carrier cannot move in a linear direction (parallel to coaxial flow tube 118), but may rotate freely about coaxial flow tube 118.

Figures 3, 4:
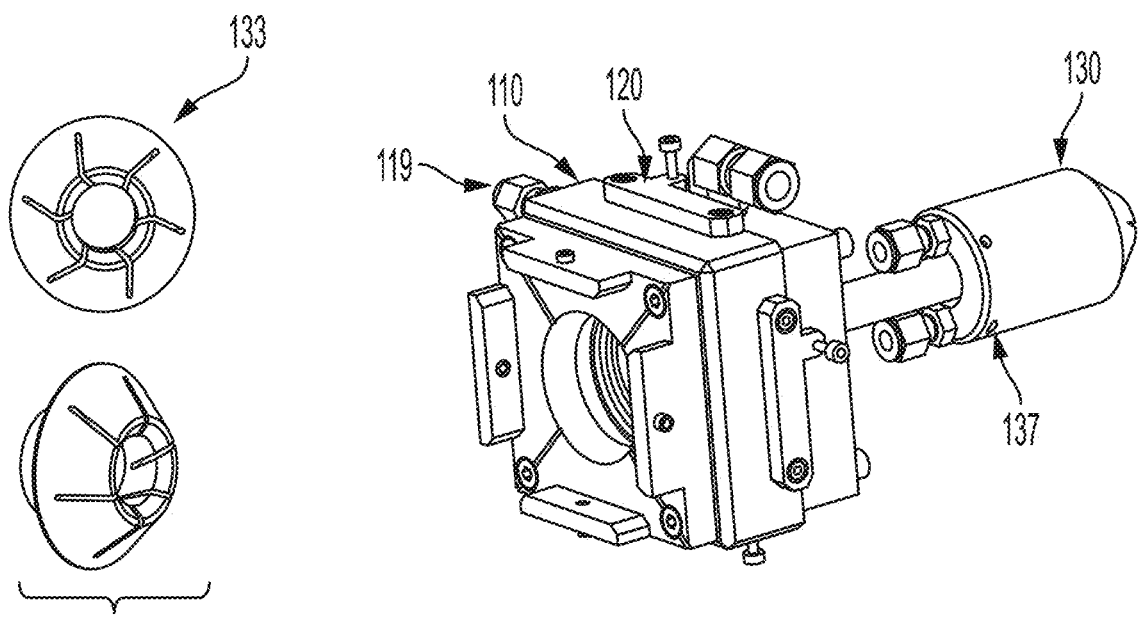
FIG. 3 is a frontal view (top) and a perspective view (bottom) of an example helical flow tip.
FIG. 4 is a perspective view of an example purging head for use with an example system for creating fluid flow paths through hydrocarbon-bearing rock formations.

During example operation, purging gas may enter helical flow device body 131 through one or more helical gas inlet fittings 132. A purging gas stream may flow through or around radial bearing 136 into helical device body 131. A resulting linear thrust caused by the purging gas stream may be attenuated or absorbed by one or more linear thrust bearings 135. A purging gas stream may flow from helical device body 131 through helical flow tip 133. A helical flow tip 133 may include holes, slots or jets, or other implements, that allow an example purging gas stream passing through the holes, slots, or jets to cause the helical flow tip 133 to rotate around coaxial flow tube 118. An example slot configuration of an example helical flow tip 133 is shown in FIG. 3. Rotation of helical flow tip 133 may cause the flow tip to discharge a spiral or helical purging gas stream substantially around an axis of a laser beam 60 or a coaxial or linear purging gas stream exiting coaxial flow tube 118.

In some implementations, the type of gas used in the coaxial or linear gas stream is the same as the gas used in the spiral or helical gas stream. In some implementations, the type of gas used in the coaxial or linear gas stream is different from the gas used in the spiral or helical gas stream.

FIG. 4 shows a perspective view of an example laser tool purging head 100. An example helical flow assembly 130 may be secured to coaxial flow tube 118, for example, through one or more retaining screws 137. An example coaxial flow assembly 110 may be cooled during operation. In some implementations, a coaxial flow device body 111 may include a water jacket connected to a water source, for example, through a cooling water fitting 119. In some implementations, an example coaxial flow assembly 110 may be adjustable. For example, a coaxial flow device body 111 may include an X/Y adjustment mechanism 120 to adjust axis or position of a coaxial flow tube 118 relative to axis of laser beam 60. For example, the position of a coaxial flow device body 111 may be adjusted such that the axis of laser beam 60 aligns with the central axis of coaxial flow tube 118.

Figure 5A:
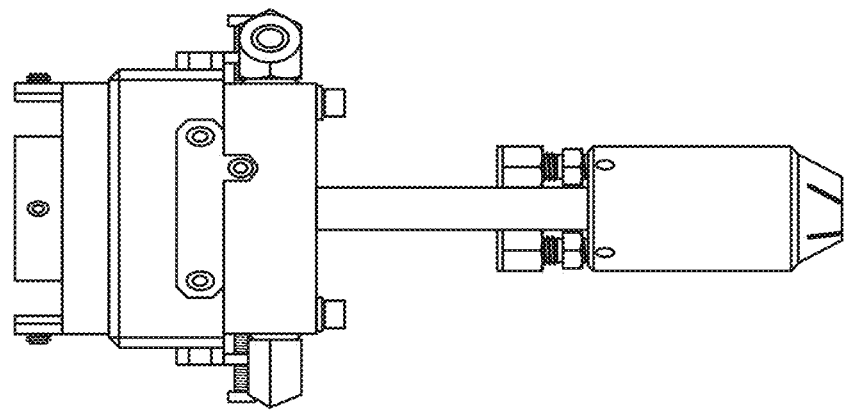
FIG. 5A is a drawing of an example purging head.
Figure 5B:
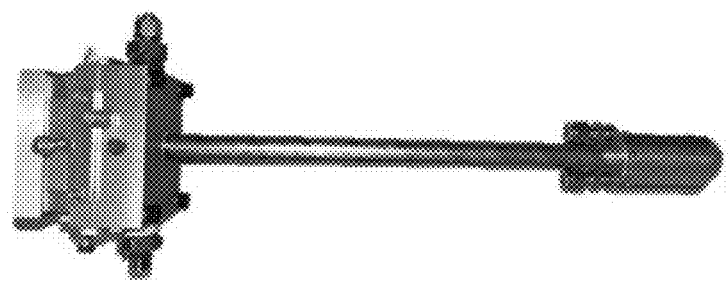
FIG. 5B a photograph of an example purging head.

FIG. 5A shows a drawing of an example purging head 100. FIG. 5B shows a photograph of an example implementation of a purging head 100.

An example laser tool may operate downhole to create openings in a casing in the wellbore to repair cementing defects. In an example, a wellbore includes a casing that is cemented in place to reinforce the wellbore against a rock formation. During a cementing procedure, cement slurry is injected between the casing and the rock formation. Defects may occur in the cement layer, which may require remedial cementing. Remedial cementing may involve squeezing additional cement slurry into the space between the casing and the rock formation. The laser tool may be used to generate a laser beam that has an energy density that is great enough to create one or more openings in the casing on or near a cementing defect. The one or more openings may provide access for a cementing tool to squeeze cement slurry through the opening into the defect.

An example laser tool may operate downhole to create openings in a casing in the wellbore to provide access for a wellbore drilling tool. In an example, an existing single wellbore is converted to a multilateral well. A multilateral well is a single well having one or more wellbore branches extending from a main borehole. In order to drill a lateral well into a rock formation from an existing wellbore, an opening is created in the casing of the existing wellbore. The laser tool may be used to create an opening in the casing at a desired location for a wellbore branching point. The opening may provide access for drilling equipment to drill the lateral wellbore.

An example laser tool may operate downhole to create openings in a casing in the wellbore to provide sand control. During operation of a well, sand or other particles may enter the wellbore causing a reduction in production rates or damage to downhole equipment. The laser tool may be used to create a sand screen in the casing. For example, the laser tool may be used to create a number of openings in the casing that are small enough to prevent or to reduce entry of sand or other particles into the wellbore while maintaining flow of production fluid into the wellbore.

An example laser tool may operate downhole to re-open a blocked fluid flow path. Production fluid flows from tunnels or cracks in the rock formation into the wellbore through holes in the wellbore casing and cement layer. These flow paths may become clogged with debris contained in the production fluid. The laser tool may be used to generate a laser beam that has an energy density that is great enough to liquefy or to sublimate the debris in the flow path, allowing for removal of the debris together with production fluid. In an example, the laser tool may be used to liquefy or to sublimate sand or other particles that may have become packed tightly around the sand screen in the casing, thus re-opening the fluid flow path into the wellbore.

An example laser tool may operate downhole to weld a wellbore casing or other component of a wellbore. During operation, one or more metal components of a wellbore may become rusted, scaled, corroded, eroded, or otherwise defective. Such defects may be repaired using welding techniques. The laser tool may be used to generate a laser beam that has an energy density that is great enough to liquefy metal or other material to create a weld. In some implementations, material of a wellbore component, such as a casing material, may be melted using the laser tool. Resulting molten material may flow over or into a defect, for example due to gravity, thus covering or repairing the defect upon cooling and hardening. In some implementations, the laser tool may be used in combination with a tool that provides filler material to the defect. The laser tool may be used to melt an amount of filler material positioned on or near a defect. The molten filler material may flow over or into a defect, thus covering or repairing the defect upon cooling and hardening.

An example laser tool may operate downhole to heat solid or semi-solid deposits in a wellbore. In producing wells, solid or semi-solid substances may deposit on wellbore walls or on downhole equipment causing reduced flow or blockages in the wellbore or production equipment. Deposits may be or include condensates (solidified hydrocarbons), asphaltene (a solid or semi-solid substance comprised primarily of carbon, hydrogen, nitrogen, oxygen, and sulfur), tar, hydrates (hydrocarbon molecules trapped in ice), waxes, scale (precipitate caused by chemical reactions, for example calcium carbonate scale), or sand. The laser tool may be used to generate a laser beam that has an energy density that is great enough to melt or to reduce the viscosity of deposits. The liquefied deposits can be removed together with production fluid or other fluid present in the wellbore.

Figure 6A:
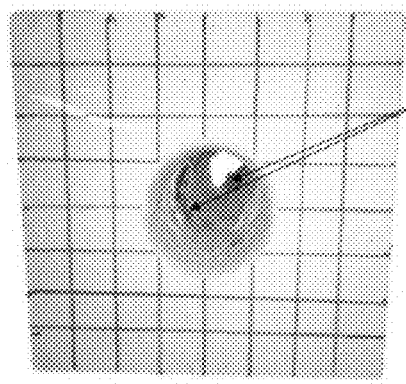
FIG. 6A is a photograph of a hole drilled in sandstone using a conventional system for creating fluid flow paths through hydrocarbon-bearing rock formations.
Figure 6B:
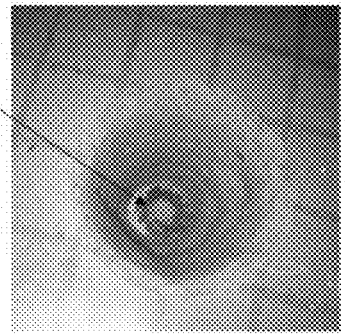
FIG. 6B is a photograph of a hole drilled in limestone using a conventional system for creating fluid flow paths through hydrocarbon-bearing rock formations.

In an example evaluation, holes were drilled in berea sandstone and limestone using (a) a laser system with a conventional purging system (coaxial-type flow only) and (b) an example system with a purging head 100 as described in this specification discharging both coaxial and helical streams. Holes drilled with a conventional system resulted in undesired rock melts and irregular (non-cylindrical) hole shape in sandstone (FIG. 6A) and limestone (FIG. 6B). Without wishing to be bound by theory, conventional purging may result in insufficient clearing of debris from hole during laser drilling. Debris may block a laser beam at least in part, which may reduce penetration efficiency and increase drilling time. Moreover, debris may be melted at least partially by the laser beam. Melted rock may stick to the sides of drilled holes, leading to undesired irregular hole geometries.

Figure 7A:
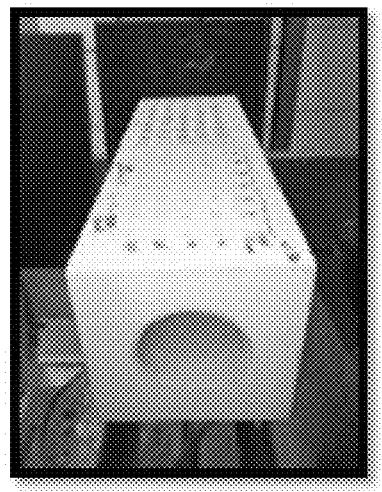
FIG. 7A is a photograph of a hole drilled in sandstone using an example system for creating fluid flow paths through hydrocarbon-bearing rock formations.
Figure 7B:
FIG. 7B is a photograph of a wall of a hole drilled in sandstone using an example system for creating fluid flow paths through hydrocarbon-bearing rock formations.

FIGS. 7A and 7B show an example result of a laser drilling operation using an example laser system including a purging head 100 as described in this specification. The rock material (sandstone) shows a smooth edge of a drilled hole (FIG. 7A) and substantially smooth walls of the hole (FIG. 7B). No undesired melting was observed. A purging head 100 may allow a high power laser based system to be used compared to lasers used for conventional purging. Using a higher power laser may save drilling time and reduce cost by drilling faster and drilling deeper holes into a formation. In some implementation, a laser tool 30 including a purging head 100 may produce holes that are at least twice as deep as those produced by a laser with conventional purging and three times as deep as holes produced without by a laser tool purging.

At least part of the laser tool system and its various modifications may be controlled by a computer program product, such as a computer program tangibly embodied in one or more information formation carriers. Information carriers include one or more tangible machine-readable storage media. The computer program product may be executed by a data processing apparatus. A data processing apparatus can be a programmable processor, a computer, or multiple computers.

A computer program may be written in any form of programming language, including compiled or interpreted languages. It may be deployed in any form, including as a stand-alone program or as a module, component, subroutine, or other unit suitable for use in a computing environment. A computer program may be deployed to be executed on one computer or on multiple computers. The one computer or multiple computers can be at one site or distributed across multiple sites and interconnected by a network.

Actions associated with implementing the systems may be performed by one or more programmable processors executing one or more computer programs. All or part of the systems may be implemented as special purpose logic circuitry, for example, a field programmable gate array (FPGA) or an ASIC application-specific integrated circuit (ASIC), or both.

Processors suitable for the execution of a computer program include, for example, both general and special purpose microprocessors, and include any one or more processors of any kind of digital computer. Generally, a processor will receive instructions and data from a read-only storage area or a random access storage area, or both. Components of a computer (including a server) include one or more processors for executing instructions and one or more storage area devices for storing instructions and data. Generally, a computer will also include one or more machine-readable storage media, or will be operatively coupled to receive data from, or transfer data to, or both, one or more machine-readable storage media. Machine-readable storage media include mass storage devices for storing data, for example, magnetic, magneto-optical disks, or optical disks. Non-transitory machine-readable storage media suitable for embodying computer program instructions and data include all forms of non-volatile storage area. Non-transitory machine-readable storage media include, for example, semiconductor storage area devices, for example, erasable programmable read-only memory (EPROM), electrically erasable programmable read-only memory (EEPROM), and flash storage area devices. Non-transitory machine-readable storage media include, for example, magnetic disks, for example, internal hard disks or removable disks, magneto-optical disks, and CD-ROM and DVD-ROM disks.

Each computing device may include a hard drive for storing data and computer programs, a processing device (for example, a microprocessor), and memory (for example, RAM) for executing computer programs.

Components of different implementations described in this specification may be combined to form other implementations not specifically set forth in this specification. Components may be left out of the systems described in this specification without adversely affecting their operation.

What is claimed:

1. A laser tool configured to operate within a wellbore of a hydrocarbon-bearing rock formation, the laser tool comprising:
    one or more optical transmission media, the one or more optical transmission media being part of an optical path originating at a laser generator configured to generate a laser beam having an axis, the one or more optical transmission media for passing the laser beam;
    an optical element that is part of the optical path, the optical element for receiving the laser beam from the one or more optical transmission media and for output to the hydrocarbon-bearing rock formation; and
    a purging head for removing dust or vapor from a path of the laser beam, the purging head in fluid communication with a gas conduit and a gas source, the purging head for discharging two or more purging gas streams, the purging head comprising a helical flow assembly, the helical flow assembly comprising:
- a helical gas inlet fitting for receiving at least one purging gas stream of the two or more purging gas streams, where the helical gas inlet fitting comprises a proximal (upstream) end in fluid communication with the gas conduit and a distal (downstream) end in fluid communication with a helical flow device body, where the helical flow device body is connected to two diametrically opposed coaxial gas inlet fittings via the coaxial flow tube, and where the helical flow device body receives at least one of the two or more purging gas streams from the helical gas inlet fitting; and
- a helical flow tip comprising one or more holes or slots in fluid communication with the helical flow device body, the helical flow tip for receiving the two or more purging gas streams from the helical flow device body and coaxial flow tube, and for discharging the two or more purging gas streams in a helical pattern around and substantially along the axis, thereby creating a helical purging gas stream,
the helical flow tip being rotatable about the axis, where rotation of the helical flow tip is caused by the at least one purging gas stream flowing through the one or more holes or slots in the helical flow tip.

2. The laser tool of claim 1, where the two or more purging gas streams comprise a coaxial purging gas stream flowing in a direction parallel to the axis.

3. The laser tool of claim 1, where the helical purging gas stream flows in a helical pattern around and substantially along the axis.

4. The laser tool of claim 1, where the two or more purging gas streams comprise a coaxial purging gas stream flowing in a direction parallel to the axis and a helical purging gas stream flowing in the helical pattern around and substantially along the axis.

5. The laser tool of claim 1, where the purging head comprises a coaxial flow assembly comprising:
- the two diametrically opposed coaxial gas inlet fittings;
- a coaxial flow device body comprising a mixing chamber in fluid communication with the two diametrically opposed coaxial gas inlet fittings for receiving the two or more purging gas streams from the coaxial gas inlet fitting; and
- a coaxial flow tube in fluid communication with the mixing chamber, the coaxial flow tube for receiving the two or more purging gas streams and for discharging the two or more purging gas streams in a direction parallel to the axis.

6. The laser tool of claim 1, where purging head comprises a coaxial flow assembly comprising:
- a first coaxial gas inlet fitting and a second coaxial gas inlet fitting, each in fluid communication with the gas conduit and the gas source, each for flowing a purging gas stream of the two or more purging gas streams;
- a coaxial flow device body comprising a mixing chamber in fluid communication with the first and second coaxial gas inlet fittings for receiving a first purging gas stream from the first coaxial gas inlet fitting and a second purging gas stream from second coaxial gas inlet fitting, the mixing chamber for mixing the first purging gas stream and the second purging gas stream to generate a mixed purging gas stream; and
- a coaxial flow tube in fluid communication with the mixing chamber, the coaxial flow tube for receiving the mixed purging gas stream and for discharging the mixed purging gas stream in a direction parallel to the axis.

7. The laser tool of claim 6, where the first purging gas stream and the second purging gas stream comprise the same type of gas.

8. The laser tool of claim 1, where the helical flow tip is mounted on a flow tip carrier, the flow tip carrier being rotatably connected to the helical flow body.

9. A method performed within a wellbore of a hydrocarbon bearing rock formation, the method comprising:
- passing, through one or more optical transmission media, a laser beam having an axis generated by a laser generator at an origin of an optical path comprising the one or more optical transmission media; and
- purging a path of the laser beam using a purging head, the purging head discharging two or more purging gas streams, the purging head comprising a helical flow assembly and a coaxial flow assembly, the helical flow assembly comprising:
  - a helical gas inlet fitting in fluid communication with a gas conduit and a gas source for flowing a purging gas stream of the two or more purging gas streams;
  - a helical flow device body in fluid communication with the helical gas inlet fitting for receiving at least one of the two or more purging gas streams from the helical gas inlet fitting;
  - a helical flow tip comprising one or more holes or slots in fluid communication with the helical flow device body, the helical flow tip for receiving at least one of the two or more purging gas streams from the helical flow device body and for discharging the two or more purging gas streams in a helical pattern around and substantially along the axis, the helical flow tip being rotatable about the axis, where rotation of the helical flow tip is caused by the two or more purging gas streams flowing through the one or more holes or slots in the helical flow tip, and where the coaxial flow assembly comprises an adjustment mechanism to adjust an axis or position of a coaxial flow tube relative to the axis of the laser beam.

10. The method of claim 9, comprising sublimating the hydrocarbon-bearing rock formation using the laser beam to create a tunnel to a target penetration depth.

11. The method of claim 9, where the two or more purging gas streams comprise a coaxial purging gas stream flowing in a direction parallel to the axis.

12. The method of claim 9, where the two or more purging gas streams comprise a helical purging gas stream flowing in a helical pattern around and substantially along the axis.

13. The method of claim 9, where the two or more purging gas streams comprise a coaxial purging gas stream flowing in a direction parallel to the axis and a helical purging gas stream flowing in a helical pattern around and substantially along the axis.

14. The method of claim 9, comprising rotating the helical flow tip about the axis.

15. The method of claim 9, comprising mixing at least one or at least two purging gas streams prior to discharge.

* * * * *